(12) United States Patent
Huang

(10) Patent No.: US 12,474,761 B2
(45) Date of Patent: Nov. 18, 2025

(54) MICRO-CONTROLLER CIRCUIT AND MANAGEMENT METHOD THEREOF

(71) Applicant: Nuvoton Technology Corporation, Hsinchu Science Park (TW)

(72) Inventor: Chi-Ray Huang, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 66 days.

(21) Appl. No.: 18/407,693

(22) Filed: Jan. 9, 2024

(65) Prior Publication Data
US 2024/0241567 A1    Jul. 18, 2024

(30) Foreign Application Priority Data

Jan. 18, 2023 (TW) ................................ 112102227

(51) Int. Cl.
*G06F 1/3287* (2019.01)
(52) U.S. Cl.
CPC ................................ *G06F 1/3287* (2013.01)
(58) Field of Classification Search
None
See application file for complete search history.

(56) References Cited

U.S. PATENT DOCUMENTS

| | | | |
|---|---|---|---|
| 2007/0174649 A1* | 7/2007 | Kuo ........................ | G06F 1/324 713/500 |
| 2009/0049314 A1* | 2/2009 | Taha ...................... | G06F 1/3296 713/300 |
| 2015/0061744 A1* | 3/2015 | Bulzacchelli ........... | G05F 1/625 327/306 |

* cited by examiner

*Primary Examiner* — Paul Yen
(74) *Attorney, Agent, or Firm* — MUNCY, GEISSLER, OLDS & LOWE, P.C.

(57) ABSTRACT

A micro-controller circuit including a central processing unit (CPU), a plurality of function circuits, a management circuit, and a driving circuit is provided. The CPU is in a first power domain. The function circuits are in a second power domain. In response to the first power domain being powered-off, the function circuits operate normally to generate an event trigger signal. The management circuit reads a look-up table to provide at least one management signal in response to the first power domain being powered-off and the event trigger signal is enabled. The driving circuit adjusts at least one driving signal according to the management signal and provides the driving signal to at least one of the function circuits.

18 Claims, 3 Drawing Sheets

MICRO-CONTROLLER CIRCUIT AND MANAGEMENT METHOD THEREOF

CROSS REFERENCE TO RELATED APPLICATIONS

This Application claims priority of Taiwan patent application Ser. No. 11/2102227, filed on Jan. 18, 2023, the entirety of which is incorporated by reference herein.

BACKGROUND OF THE INVENTION

Field of the Invention

The present invention relates to a micro-controller circuit, and, in particular, to a micro-controller circuit that has many power domains.

Description of the Related Art

Generally, when the central processing unit (CPU) of a micro-control circuit executes program codes, the CPU dynamically adjusts the operating voltage and frequency of the corresponding circuits. However, when the CPU enters a sleep mode, the CPU cannot continue to adjust the operating voltage and frequency.

BRIEF SUMMARY OF THE INVENTION

In accordance with an embodiment of the disclosure, a micro-controller circuit comprises a central processing unit (CPU), a plurality of function circuits, a management circuit, and a driving circuit. The CPU is in a first power domain. The function circuits are in a second power domain. In response to the first power domain being powered-off, the function circuits operate normally to generate an event trigger signal. The management circuit reads a look-up table to provide at least one management signal in response to the first power domain being powered-off and the event trigger signal is enabled. The driving circuit adjusts at least one driving signal according to the management signal and provides the driving signal to at least one of the function circuits.

An exemplary embodiment of a management method is described in the following paragraph. The management method dynamically manages the power consumptions of a plurality of function circuits which are outside of a core power domain in response to the core power domain being powered-off. An event trigger signal provided by the function circuits is received. A look-up table is read to generate at least one management signal according to the event trigger signal. At least one driving signal is adjusted according to the management signal. The driving signal is provided to at least one of the function circuits.

The management method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a micro-controller circuit for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
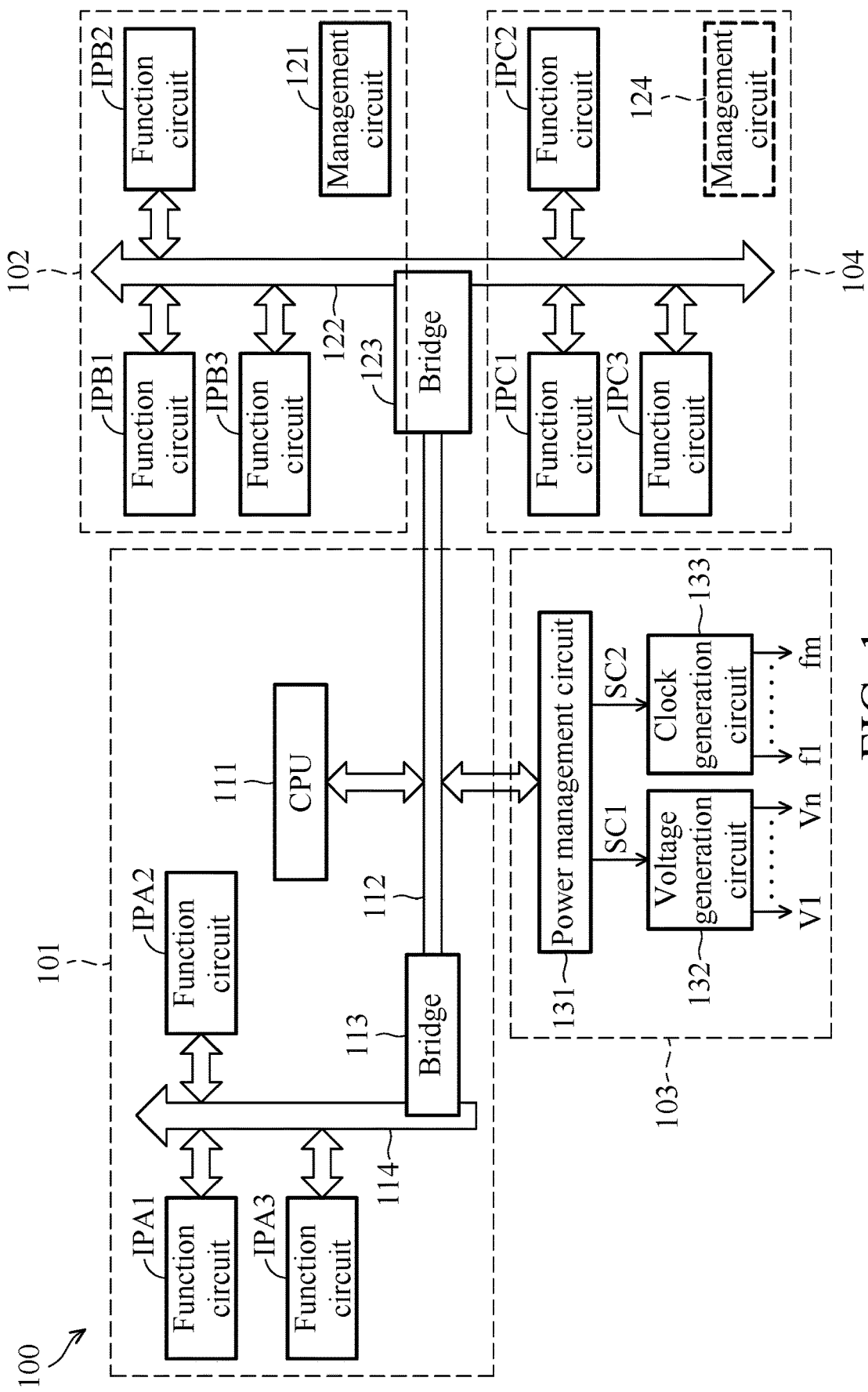
FIG. 1 is a schematic diagram of an exemplary embodiment of a micro-controller circuit according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a micro-controller circuit according to various aspects of the present disclosure. The micro-controller circuit 100 comprises power domains 101~103. Each of the power domains 101~103 comprises at least one of circuit or at least one element device. Each circuit and element device in the same power domain uses the same power circuit. For example, a first power circuit in the power domain 101 provides an operation voltage to the central processing unit (CPU) 111 and the function circuits IPA1~IPA3, a second power circuit in the power domain 102 provides another operation voltage to the management circuit 121 and the function circuits IPB1~IPB3.

In one embodiment, different circuits or element devices in the same power domain receive different operation voltages or the same operation voltage. Taking the power domain 101 as an example, the operation voltage of the CPU 111 may be the same as the operation voltage of one of the function circuits IPA1~IPA3. In this case, the operation voltage of one of the function circuits IPA1~IPA3 may be different from the operation voltage of another of the function circuits IPA1~IPA3.

In another embodiment, the circuits or the element devices in the same power domain may be simultaneously turned on or turned off. Taking the power domain 101 as an example, when one of the function circuits IPA1~IPA3 is turned on, another of the function circuits IPA1~IPA3 is turned off. When the CPU 111 is turned off, the function circuits IPA1~IPA3 are turned off. In some embodiment, each of the power domains 101~103 can be served as a processing unit, a module, a circuit, a part of a circuit or a set of different parts of different circuits. In another embodiment, different power circuits are in the same power domain or in different power domains.

In this embodiment, the power domain 101 comprises the CPU 111 and the function circuits IPA1~IPA3. The CPU 111 and the function circuits IPA1~IPA3 share a single power circuit. The single power circuit provides at least one operation voltage. In this case, the operation voltage of one of the CPU 111 and the function circuits IPA1~IPA3 is the same as the operation voltage of another of the CPU 111 and the function circuits IPA1~IPA3.

In other embodiments, the micro-controller circuit 100 further comprises a bus 112 in the power domain 101. The CPU 111 communicates with other circuits (not shown) or other element devices (not shown) in the power domain 101 via the bus 112. The kind of bus 112 is not limited in the present disclosure. In one embodiment, the bus 112 is a system bus, such as an advanced high performance bus (AHB).

In some embodiments, the micro-controller circuit 100 further comprises a bridge 113 and a bus 114 in the power domain 101. The bridge 113 is coupled between the buses 112 and 114. The function circuits IPA1~IPA3 communicate with each other via the bus 114. In some embodiments, the CPU 111 communicates with the function circuits IPA1~IPA3 via the bus 112, the bridge 113, and the bus 114. The kind of bus 114 is not limited in the present disclosure. In one embodiment, the bus 114 is an advanced peripheral bus (APB). In this case, the bridge 113 is an AHB-APB bridge. The number of function circuits is not limited in the present disclosure. More or fewer function circuits may be in the power domain 101.

In this embodiment, the management circuit 121 and the function circuits IPB1~IPB3 are in the power domain 102. The management circuit 121 and the function circuits IPB1~IPB3 share the same power circuit. The power circuit provides at least one operation voltage to the management circuit 121 and the function circuits IPB1~IPB3. The operation of at least one of the management circuit 121 and the function circuits IPB1~IPB3 may be the same as the operation of another of the management circuit 121 and the function circuits IPB1~IPB3. For example, the function circuits IPB1~IPB3 use the same operation voltage, which may be the same as or different from the operation voltage of the management circuit 121.

When the power domain 101 is powered-off, the micro-controller circuit 100 operates in a low-power mode. In this mode, since the power circuit in the power domain 102 continues providing power, the management circuit 121 and the function circuits IPB1~IPB3 work normally. The management circuit 121 dynamically manages the operation voltage and/or the operation clock of at least one of the function circuits IPB1~IPB3 to adjust the power consumption of the power domain 102, thus achieving the purpose of more power saving. In this embodiment, the management circuit 121 performs a dynamic voltage and frequency scaling (DVFS) operation. The management circuit 121 selects a combination of a voltage and a frequency according to a trigger event which is generated by one of the function circuits and then dynamically adjusts the operation voltage and/or the operation clock of at least one of the function circuits IPB1~IPB3.

In one embodiment, when a specific function circuit of the function circuits IPB1~IPB3 completes a specific operation, the specific function circuit sends a request signal (not shown). The management circuit 121 appropriately adjusts the level of the operation voltage and/or the operation clock of at least one of the function circuits IPB1~IPB3 according to the request signal.

In some embodiments, the micro-controller circuit 100 further comprises a bus 122 in the power domain 102. In this case, the function circuits IPB1~IPB3 communicate with each other via the bus 122. The type of bus 122 is not limited in the present disclosure. In one embodiment, the bus 122 is an APB. In another embodiment, the micro-controller circuit 100 further comprises a bridge 123 in the power domain 102. The bridge 123 is coupled between the buses 122 and 112. In this case, the CPU 111 communicates with the function circuits IPB1~IPB3 via the bus 112, the bridge 123 and the bus 122. In one embodiment, the bridge 123 is an AHB-APB bridge. The number of function circuits in the power domain 102 is not limited in the present disclosure. In other embodiments, more or fewer function circuits are in the power domain 102.

The micro-controller circuit 100 further comprises a power management circuit 131, a voltage generation circuit 132, and a clock generation circuit 133 in the power domain 103. The power management circuit 131 is coupled to the bus 112 and generates control signals SC1 and SC2 according to a control command of the bus 112. In one embodiment, the control command is provided by the CPU 111. In this case, the CPU 111 uses the control command to adjust the operation voltage and/or the operation clock of each circuit in the micro-controller circuit 100.

The voltage generation circuit 132 generates the operation voltages V1~Vn according to the control signal SC1. At least one of the operation voltages V1~Vn may be the same as another of the operation voltages V1~Vn. In one embodiment, a first portion of the operation voltages V1~Vn is served as the operation voltages of the circuits in the power domain 101. The first portion has at least one operation voltage. Additionally, a second portion of the operation voltages V1~Vn is served as the operation voltages of the circuits in the power domain 102. The second portion has at least one operation voltage. The structure of voltage generation circuit 132 is not limited in the present disclosure. In one embodiment, the voltage generation circuit 132 comprises a plurality of power circuits (not shown). In this case, each power circuit generates at least one operation voltage.

The clock generation circuit 133 generates operation clocks f1~fm according to the control signal SC2. The frequency of at least one of the operation clocks f1~fm may be the same as the frequency of another of the operation clocks f1~fm. In one embodiment, a first portion of the operation clocks f1~fm may be served as the operation clocks of the circuits in the power domain 101, and a second portion of the operation clocks f1~fm may be served as the operation clocks of the circuits in the power domain 102.

In some embodiment, the power domain 101 is a high performance power domain. The power domain 101 may be referred to as a core power domain. When the circuits or the element devices in the power domain 101 work, the micro-controller circuit 100 has high performance. In other embodiments, the power domain 102 is a low power domain. In this case, when the power domain 101 is powered-off (i.e., the power circuits in the power domain 101 stop operating), the power circuits in the power domain 102 continue working. Since the circuits and the element devices in the power domain 101 stop working, the power consumption of the micro-controller circuit 100 can be reduced. At this time, only the circuits and element devices in the power domain 102 work normally. Therefore, the micro-controller circuit 100 enters a low-power mode.

In other embodiment, even if the power domain 101 is powered-off, the power circuits in the power domain 103 continue working. When a wake-up event occurs, the power circuits in the power domain 103 provide power to the circuits and the element devices in the power domain 101. However, when the power domain 101 is powered-off, the CPU 111 stops providing the control command to the power management circuit 131. Therefore, the power management circuit 131 is not controlled by the CPU 111 temporarily.

In this embodiment, when the power domain 101 is powered-off, the power management circuit 131 is controlled by the management circuit 121. The management circuit 121 requests the power management circuit 131 to generate the appropriate control signals SC1 and SC2 according to the request signal sent from the function circuits IPB1~IPB3, such as event information or trigger information. In this case, the management circuit 121 utilizes the power management circuit 131 to adjust the operation voltage and/or the operation clock of at least one of the function circuits IPB1~IPB3. Therefore, the power consumption of the micro-controller circuit 100 is adjustable in the low-power mode. Furthermore, when the power circuits in the power domain 101 work, the management circuit 121 may stop operating temporarily. Therefore, the management circuit 121 does not increase the power consumption of the micro-controller circuit 100.

In other embodiments, the micro-controller circuit 100 further comprises a power domain 104. The function circuits IPC1~IPC3 are in the power domain 104. The function circuits IPC1~IPC3 communicate with each other via the bus 122. In one embodiment, the CPU 111 communicates with the function circuits IPC1~IPC3 via the bus 112, the bridge 123 and the bus 122. In other embodiment, more or fewer function circuits are in the power domain 104.

In some embodiments, the power domain 104 is an ultra-low power domain. In this case, when the power domains 101 and 102 are powered-off, the circuits and the element devices in the power domain 104 continue operating. At this time, the power consumption of the micro-controller circuit 100 when the power domains 101 and 102 are powered-off is lower than the power consumption of the micro-controller circuit 100 when the power domain 101 is powered-off and the power domain 102 works normally. In one embodiment, another management circuit 124 is in the power domain 104. The management circuit 124 adjusts the operation voltages and/or operation clocks of the function circuits IPC1~IPC3. Since the characteristic of the management circuit 124 is similar to the characteristic of the management circuit 121, the related description is omitted here. The operating principle of the management circuit 121 is shown in FIG. 2 and described in the following paragraphs.

Figure 2:
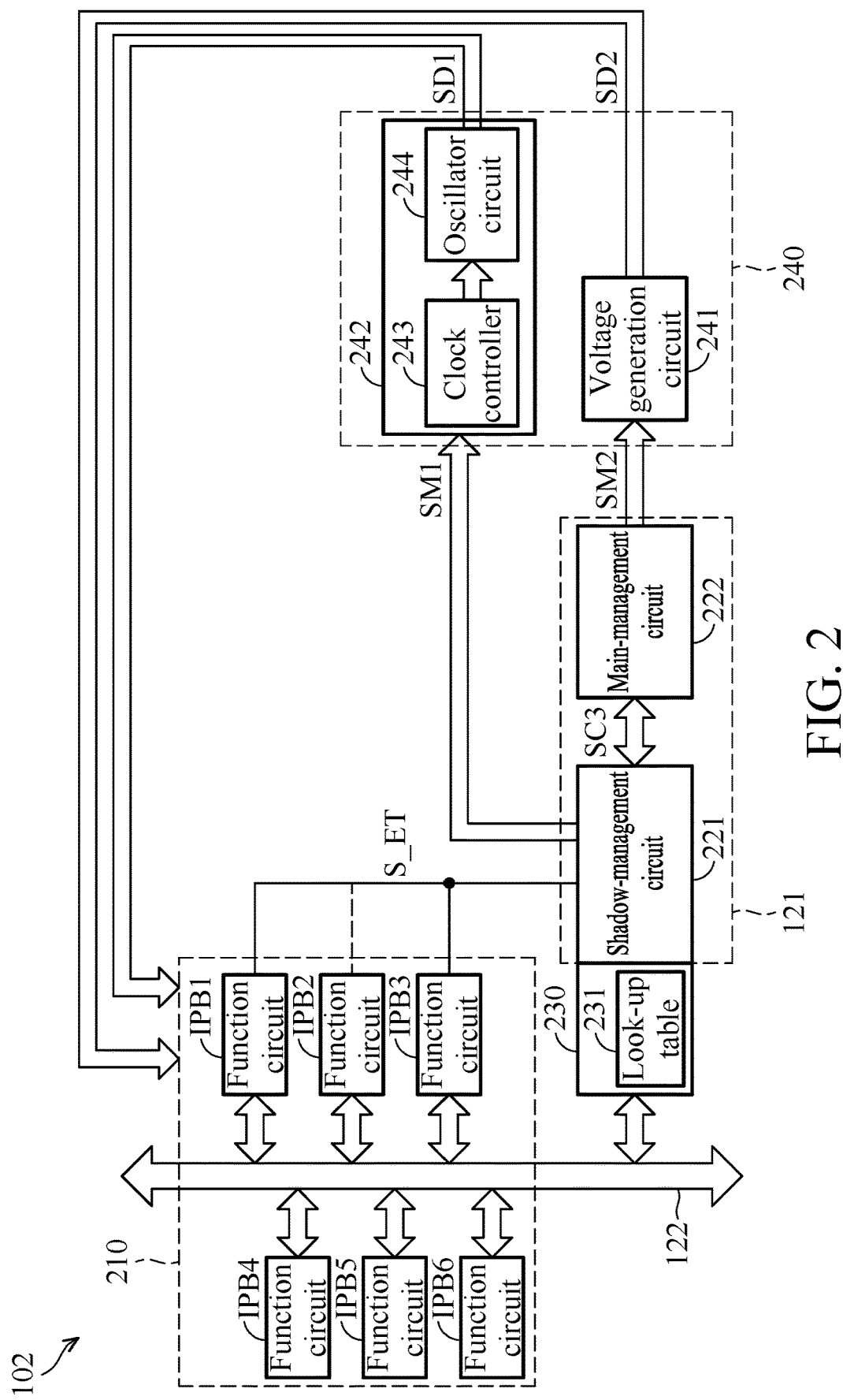
FIG. 2 is a schematic diagram of an exemplary embodiment of power domains according to various aspects of the present disclosure.

FIG. 2 is a schematic diagram of an exemplary embodiment of the power domain 102 according to various aspects of the present disclosure. The power domain 102 comprises a circuit module 210, a management circuit 121, and a driving circuit 240. The circuit module 210 comprises the function circuits IPB1~IPB3. The structures of function circuits IPB1~IPB3 are not limited in the present disclosure. Each of the function circuits IPB1~IPB3 is constituted by logic circuits to perform a corresponding operation.

For example, assume that the function circuit IPB1 is an analog-to-digital converter (ADC). In this case, the function circuit IPB1 performs a conversion operation to convert an analog signal to a digital signal. In another embodiment, the function circuit IPB1 is a digital-to-analog converter (DAC) to convert a digital signal into an analog signal.

In other embodiments, the function circuit IPB2 is a memory to perform a storing operation. In this case, the function circuit IPB3 may be a memory controller to access the function circuit IPB2. The function circuit IPB3 accesses the function circuit IPB2 via the bus 122. The kinds of function circuits IPB2 and IPB3 are not limited in the present disclosure. In one embodiment, the function circuit IPB2 is a static random-access memory (SRAM). In this case, the function circuit IPB3 is a direct memory access (DMA) controller.

The number of function circuits is not limited in the present disclosure. In some embodiments, the circuit module 210 further comprises the function circuits IPB4~IPB6. The operation performed by at least one of the function circuits IPB4~IPB6 may be the same as or different from the operation performed by anther of the function circuits IPB1~IPB3. In one embodiment, the function circuits IPB4 and IPB5 perform a communication operation. The communication protocol of the function circuit IPB4 may be the same as or different from the communication protocol of the function circuit IPB5. In some embodiments, the function circuit IPB4 is an universal asynchronous receiver/transmitter (UART), and the function circuit IPB5 is an inter-integrated circuit bus (I2C) circuit. In another embodiment, the function circuit IPB6 performs a count operation. For example, the function circuit IPB6 is a timer.

In this embodiment, when one function circuit of the circuit module 210 completes a corresponding operation, the function circuit enables an event trigger signal S_ET. To brevity, the function circuits IPB1 and IPB3 are provided as an example. When the function circuit IPB1 completes a first specific operation, the function circuit IPB1 enables the event trigger signal S_ET (or a first event trigger signal). When the function circuit IPB3 completes a second specific operation, the function circuit IPB3 enables the event trigger signal S_ET (or a second event trigger signal). In other embodiments, when anyone of the function circuits IPB4~IPB6 completes a corresponding operation, the function circuit, which completes the corresponding operation enables the event trigger signal S_ET.

The management circuit 121 dynamically adjusts the operation voltages and/or the operation clocks of at least one of the function circuits according to the event trigger signal enabled by different function circuits. In one embodiment, the management circuit 121 uses a single input terminal to receive the event trigger signal S_ET. In this case, the management circuit 121 decodes the event trigger signal S_ET to obtain which function circuit enables the event trigger signal S_ET. In other embodiments, the management circuit 121 may not decode the event trigger signal S_ET. In this case, when the event trigger signal S_ET is enabled, this indicates that a function circuit of the circuit module 210 has completed a corresponding operation. Therefore, the management circuit 121 starts adjust the operation voltages and/or operation clocks of the circuit module 210. In some embodiments, the management circuit 121 comprises many input terminals to receive event trigger signals which are generated by different function circuits.

In some embodiments, the event trigger signal generated by a function circuit is used to trigger another function circuit. Taking the function circuits IPB1 and IPB3 as an example, when the function circuit IPB3 finishes a second specific operation, the function circuit IPB3 enables a first event trigger signal. After receiving the enabled first event trigger signal, the function circuit IPB1 performs a first specific operation. When the function circuit IPB1 finishes the first specific operation, the function circuit IPB1 enables a second event trigger signal. The management circuit 121 operates according to the enabled second event trigger signal.

The management circuit 121 reads a look-up table 231 according to the event trigger signal S_ET to provide at least one of the management signals SM1 and SM2. In one embodiment, the look-up table 231 is stored in a memory 230. In this case, the memory 230 is also a function circuit. In some embodiments, a function circuit (e.g., IPB3) of the circuit module 210 reads data stored in another function circuit (e.g., IPB2) via the bus 122. Then, the function circuit writes the data to the memory 230 via the bus 122 to update the look-up table 231. Since the voltage and frequency combinations in the look-up table are properly adjusted, when the management circuit 121 adjusts the operation voltages and/or operation clocks, the adjustment of the operation voltages and/or operation clocks is more flexible. In other embodiments, when the power circuits in power domain 101 provide power, the CPU 111 updates the look-up table 231 via the bus 112, the bridge 123 and the bus 122. In this case, the CPU 111 may update the data stored in the function circuit IPB2 and then the function circuit IPB3 moves the data of the function circuit IPB2 to the memory 230.

In this embodiment, the look-up table 231 stores many driving data. The type of driving data is not limited in the present disclosure. In one embodiment, the look-up table 231 records many voltage information or many frequency information. The management circuit 121 finds different voltage information or different frequency information from the look-up table 231 according to different event trigger signals. In another embodiment, the look-up table 231 records many voltage information and many frequency information. Each voltage information corresponds to one of the frequency information. In this case, the management circuit 121 finds different combinations of the voltage information and frequency information from the look-up table 231 according to different event trigger signals.

The structure of management circuit 121 is not limited in the present disclosure. In this embodiment, the management circuit 121 comprises a shadow-management circuit 221 and a main-management circuit 222. The shadow-management circuit 221 reads the look-up table 231 according to the event trigger signal S_ET to provide a control signal SC2. The main-management circuit 222 generates a management signal SM2 according to the control signal SC3.

The driving circuit 240 generates a driving signal SD2 according to the management signal SM2 and provides the driving signal SD2 to at least one of the function circuits IPB1~IPB3. In one embodiment, each of the function circuits IPB1~IPB3 receives the driving signal SD2 and only the enabled function circuit words. For example, assume that the function circuit IPB1 is enabled and the function circuits IPB2 and IPB3 do not be enabled. In this case, only the function circuit IPB1 operates according to the driving signal SD2. Even if the function circuits IPB2 and IPB3 receive the driving signal SD2, the function circuits IPB2 and IPB3 do not operate. If the function circuits IPB2 and IPB3 are enabled and the function circuit IPB1 does not be enabled, the function circuits IPB2 and IPB3 operate according to the driving signal SD2.

The kind of driving circuit 240 is not limited in the present disclosure. In one embodiment, the driving circuit 240 comprises a voltage generation circuit 241. The voltage generation circuit 241 adjusts the driving signal SD2 according to the management signal SM2. In this case, the driving signal SD2 is an operation voltage. In some embodiments, the voltage generation circuit 241 is an LDO. In other embodiments, the driving circuit 240 comprises more voltage generation circuits. In this case, the main-management circuit 222 controls different voltage generation circuits. For example, the driving circuit 240 comprises a first voltage generation circuit and a second voltage generation circuit. The first voltage generation circuit generates at least one voltage to one of the function circuits IPB1~IPB6. The second voltage generation circuit generates at least one voltage to another of the function circuits IPB1~IPB6.

In some embodiments, the driving circuit 240 further comprises a clock generation circuit 242. The clock generation circuit 242 adjusts the frequency of a driving signal SD1 according to a management signal SM1. In this case, the driving signal SD1 has at least one operation clock. The clock generation circuit 242 provides the driving signal SD1 to at least one of the function circuits IPB1~IPB6. The structure of the clock generation circuit 242 is not limited in the present disclosure. In one embodiment, the clock generation circuit 242 comprises a clock controller 243 and an oscillator circuit 244.

The clock controller 243 adjusts the frequency of the clock signal (e.g., SD1) generated by the oscillator circuit 244 according to the management signal SM1. In one embodiment, the oscillator circuit 244 is a resistor-capacitor (RC) oscillator. In other embodiments, the clock generation circuit 242 comprises more oscillator circuits. In this case, the clock controller 243 adjusts the frequencies of operation clocks generated by different oscillator circuits. The operation clocks generated by different oscillator circuits are provided to different function circuits.

In one embodiment, the management signal SM1 is provided by the shadow-management circuit 221. The shadow-management circuit 221 reads the look-up table 231 according to the event trigger signal S_ET to obtain corresponding frequency information. Then, the shadow-management circuit 221 directs the clock generation circuit 242 to adjust the frequency of the driving signal SD1 according to the corresponding frequency information. In another embodiment, the management signal SM1 is provided by the main-management circuit 222. In this case, the main-management circuit 222 not only controls the voltage generation circuit 241, but also controls the clock generation circuit 242.

The structure of the driving circuit 240 is not limited in the present disclosure. In one embodiment, the driving circuit 240 only comprises the clock generation circuit 242. In this case, the management circuit 121 only manages the operation clocks of the function circuits IPB1~IPB6. In another embodiment, the driving circuit 240 only comprises the voltage generation circuit 241. In this case, the shadow-management circuit 221 only manages the operation voltages of the function circuits IPB1~IPB6. In some embodiments, the driving circuit 240 comprises the voltage generation circuit 241 and the clock generation circuit 242. In this case, the driving circuit 240 manages the operation voltages and the operation clocks of the function circuits IPB1~IPB6.

In some embodiments, the same function circuit of the circuit module 210 works according to the un-adjusted driving signal and the adjusted driving signal. Taking the driving signal SD1 as an example, before the driving circuit 240 adjusts the driving signal SD1, the function circuit IPB1 operates according to the un-adjusted driving signal SD1. After the driving circuit 240 adjusts the driving signal SD1, the function circuit IPB1 operates according to the adjusted driving signal SD1. In another embodiment, after the driving circuit 240 adjusts the driving signal SD1, the function circuit IPB2 operates according to the adjusted driving signal SD1.

In this embodiment, the shadow-management circuit 221 operates in the power domain 102, and the main-management circuit 222 and the driving circuit 240 operates in the power domain 103. In other words, when the power domain 101 is powered-off, the main-management circuit 222 and the driving circuit 240 work normally. In one embodiment, the power management circuit 131, the voltage generation circuit 132, and the clock generation circuit 133 serve as the main-management circuit 222, the voltage generation circuit 241, and the clock generation circuit 242, respectively. In this case, when the power circuit in the power domain 101 stops providing power, the main-management circuit 222, the voltage generation circuit 241, and the clock generation circuit 242 are controlled by the shadow-management circuit 221. When the power circuit in the power domain 101 provides power normally, the main-management circuit 222, the voltage generation circuit 241, and the clock generation circuit 242 are controlled by the CPU 111. At this time, the shadow-management circuit 221 stops operating.

Figure 3:
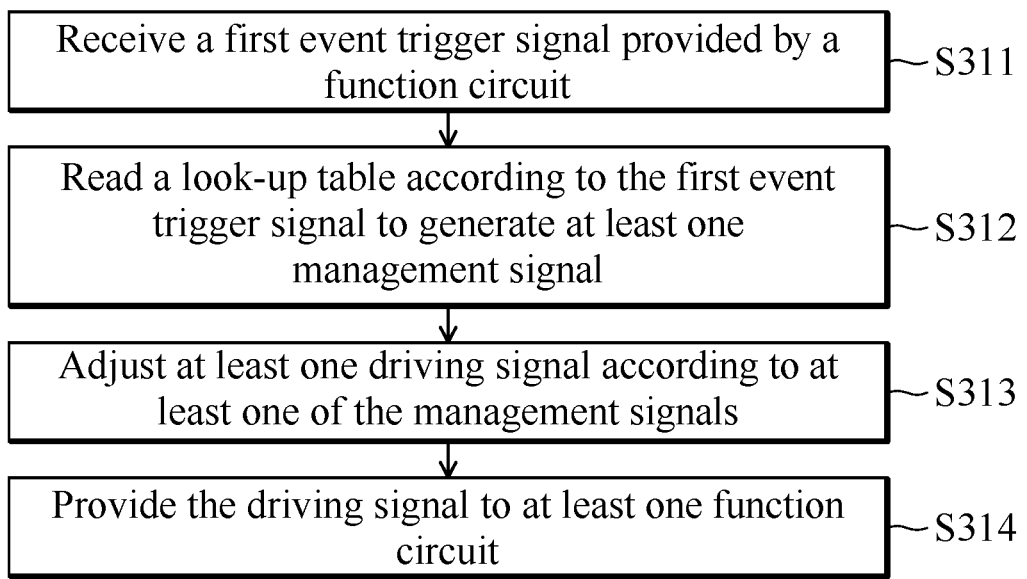
FIG. 3 is a flowchart of an exemplary embodiment of a management method according to various aspects of the present disclosure.

FIG. 3 is a flowchart of an exemplary embodiment of a management method according to various aspects of the present disclosure. The management method is performed to dynamically manage the power consumptions of a plurality of function circuits outside of a core power domain when the core power domain is powered-off. The management method may take the form of a program code. When the program code is loaded into and executed by a machine, the machine thereby becomes a micro-controller circuit for practicing the management method.

First, a first event trigger signal provided by a function circuit is received (step S311). In this embodiment, the function circuit is outside of the core power domain. When the core power domain is powered-off, the function circuit works normally. In one embodiment, the function circuit is in a low power domain. In this case, when the core power domain is powered-off, the circuits in the low power domain work normally. When the power in the core power domain is recovered, the circuits in the low power domain may stop operating or work normally.

In some embodiments, after a first function circuit outside of the core power domain completes a first specific operation, the first function circuit enables a first event trigger signal. In another embodiment, after a second function circuit outside of the core power domain completes a second specific operation, the second function circuit enables a second event trigger signal to direct the first function circuit to perform the first specific operation. In this case, the first and the second function circuits are in the low power domain.

A look-up table is read according to the first event trigger signal to generate at least one management signal (step S312). In one embodiment, the look-up table is in the low power domain. The look-up table may record many voltage information or many frequency information. In other embodiments, the look-up table records many voltage information and many frequency information. In this case, each of the voltage information corresponds to one of the frequency information. In this embodiment, step S312 is performed to generate two management signals.

At least one driving signal is adjusted according to at least one of the management signals (step S313). The driving signal may be a voltage signal or a clock signal. In this case, step S313 is performed to adjust the voltage level of the voltage signal or adjust the frequency of the clock signal according to at least one of the management signals.

Then, the driving signal is provided to at least one function circuit (step S314). In one embodiment, step S314 is performed to provide the driving signal to at least one function circuit outside of the core power domain. In this case, the function circuit receiving the driving signal is in a low power domain. In some embodiments, the function circuits receiving the adjusted driving signal is the function circuit which provides the first event trigger signal. For example, a specific function circuit in the low power domain enables the first event trigger signal and then operates according to the adjusted driving signal. When the specific function circuit completes a specific operation, the specific function circuit re-enables the first event trigger signal. In another embodiment, a function circuit in the low power domain operates according to un-adjusted driving signal and then enables the first event trigger signal after completing the specific operation. In this case, another function circuit in the low power domain operates according to the adjusted driving signal.

In some embodiments, step S312 is performed to read the look-up table according to the first event trigger signal to generate a first management signal and a second management signal. In this case, the first management signal is related with the voltage information, and the second management signal is related with the frequency information. Step S313 is performed to adjust a first driving signal (e.g., to adjust the voltage level of a voltage signal) according to the first management signal and adjusts a second driving signal (e.g., to adjust the frequency of a clock signal) according to the second management signal. Step S314 is performed to provide the adjusted first driving signal and the adjusted second driving signal to the same function circuit or different function circuits outside of the core power domain. In one embodiment, step S314 is performed to provide the adjusted first driving signal and the adjusted second driving signal to the function circuits in the low power domain.

In one embodiment, step S312 is performed by a shadow-management circuit. The shadow-function circuits may generate a first management signal to a driving circuit to direct the driving circuit to adjust a first driving signal. In another embodiment, the shadow-management circuit further generates a control signal to direct a main-management circuit to generate a second management signal. In this case, the driving circuit adjusts a second driving signal according to the second management signal. In one embodiment, one of the first and the second management signals is a voltage signal, and the other is a clock signal. In some embodiment, the main-management circuit is outside of the core power domain. In this case, the power circuits in the power domain having the main-management circuit are always on. The power domain of the main-management circuit is different from the low power domain.

In other embodiments, the function circuits in the low power domain updates the look-up table used in step S312. For example, when a specific function circuit in the low power domain is activated, the specific function circuit may access a memory to obtain read data. The specific function circuit uses the read data to update the look-up table. In another embodiment, a CPU in the core power domain updates the look-up table used in step S312. When the power circuits in the core power domain provide power, the CPU updates the look-up table. When the core power domain is powered-off, step S312 is performed to generate at least one management signal according to the updated look-up table.

When the core power domain is powered-off, the micro-controller circuit enters a low-power mode. In the low-power mode, the operation voltages and/or operation frequencies of the function circuits outside the core power domain are managed. Each function circuit operates according to the appropriate voltage and the appropriate frequency, and the CPU does not need to support the adjustment of the operation voltages and/or operation frequencies. Therefore, the micro-controller circuit achieves the purpose of power saving and optimization. Additionally, when the core power domain is recovered, the elements in the core power domain dynamically adjust the power consumptions of other power domains. The micro-controller circuit strikes a balance between performance and power efficiency.

Management methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a micro-controller circuit for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a micro-controller circuit for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-controller circuit comprising:
   a central processing unit (CPU) in a first power domain;
   a plurality of function circuits in a second power domain, wherein in response to the first power domain being powered-off, the function circuits operate normally to generate a first event trigger signal;
   a management circuit reading a look-up table to provide at least one management signal in response to the first power domain being powered-off and the first event trigger signal being enabled; and
   a driving circuit adjusting at least one driving signal according to the management signal and providing the driving signal to at least one of the function circuits,
   wherein the management circuit comprises:
      a shadow-power management circuit in the second power domain, reading the look-up table to provide a control signal and a first management signal according to the first event trigger signal; and
      a main-power management circuit generating a second management signal according to the control signal, and
   wherein the driving circuit adjusts a first driving signal according to the first management signal, adjusts a second driving signal according to the second management signal, and provides the first and second driving signals to at least one of the function circuits.

2. The micro-controller circuit as claimed in claim 1, wherein the main-power management circuit is in a third power domain, and the power of the third power domain is always-on.

3. The micro-controller circuit as claimed in claim 2, wherein the third power domain is separated from the first and the second power domains.

4. The micro-controller circuit as claimed in claim 1, wherein the driving circuit comprises:
   a clock generation circuit adjusting the frequency of the first driving signal according to the first management signal; and
   a voltage generation circuit adjusting the voltage level of the second driving signal according to the second management signal.

5. The micro-controller circuit as claimed in claim 4, wherein the clock generation circuit comprises a resistor-capacitor oscillator, and the voltage generation circuit is a low-dropout (LDO) regulator.

6. The micro-controller circuit as claimed in claim 1, wherein the driving circuit comprises a voltage generation circuit or a clock generation circuit.

7. The micro-controller circuit as claimed in claim 1, wherein after a first function circuit among the function circuits completes a first specific operation, the first function circuit enables the first event trigger signal.

8. The micro-controller circuit as claimed in claim 7, wherein after a second function circuit among the function circuits completes a second specific operation, the second function circuit enables a second event trigger signal to direct the first function circuit to perform the first specific operation.

9. The micro-controller circuit as claimed in claim 1, wherein before the driving circuit adjusts a first driving signal, a first function circuit among the function circuits operates according to the first driving signal, and after the driving circuit adjusts the first driving signal, a second function circuit of the function circuits operates according to the adjusted first driving signal.

10. The micro-controller circuit as claimed in claim 9, wherein the second function circuit updates the look-up table.

11. The micro-controller circuit as claimed in claim 1, wherein before the driving circuit adjusts a first driving signal, a first function circuit among the function circuits operates according to the first driving signal, and after the driving circuit adjusts the first driving signal, the first function circuit operates according to the adjusted first driving signal.

12. A management method dynamically managing power consumption of a plurality of function circuits which are outside of a core power domain in response to the core power domain being powered-off, comprising:
   receiving a first event trigger signal provided by the function circuits;
   reading a look-up table to generate at least one management signal according to the first event trigger signal;
   adjusting at least one driving signal according to the management signal;
   providing the driving signal to at least one of the function circuits;
   using a shadow-power management circuit to read the look-up table to provide a first event trigger signal and a control signal; and providing the control signal to a main-power management circuit to direct the main-power management circuit to generate a second management signal according to the control signal, wherein the main-power management circuit is separated from the core power domain, and the power received by the main-power management circuit is always-on.

13. The management method as claimed in claim 12, wherein the power domain of the main-power management circuit is different from the power domain of the function circuits.

14. The management method as claimed in claim 12, wherein the step of adjusting at least one driving signal comprises:
  adjusting the frequency of a first driving signal according to the first management signal; and
  adjusting the voltage level of a second driving signal according to the second management signal.

15. The management method as claimed in claim 12, further comprising:
  enabling the first event trigger signal after a first function circuit of the function circuits completes a first specific operation; and
  enabling a second event trigger signal to direct the first function circuit to perform the first specific operation after a second function circuit of the function circuits completes a second specific operation.

16. The management method as claimed in claim 15, wherein the second specific operation updates the look-up table.

17. The management method as claimed in claim 12, wherein:
  before the first driving signal is adjusted, a first function circuit of the function circuits operates according to the first driving signal, and
  after the first driving signal has been adjusted, a second function circuit of the function circuits operates according to the adjusted first driving signal.

18. The management method as claimed in claim 12, wherein:
  before the first driving signal is adjusted, a specific function circuit of the function circuits operates according to the first driving signal, and
  after the first driving signal has been adjusted, the specific function circuit operates according to the adjusted first driving signal.

* * * * *